(12) United States Patent
Choi

(10) Patent No.: US 10,095,340 B2
(45) Date of Patent: Oct. 9, 2018

(54) TOUCH SENSOR LAMINATE, TOUCH SCREEN PANEL AND IMAGE DISPLAY DEVICE INCLUDING THE SAME

(71) Applicant: DONGWOO FINE-CHEM CO., LTD., Jeollabuk-do (KR)

(72) Inventor: Byung Jin Choi, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 15/661,440

(22) Filed: Jul. 27, 2017

(65) Prior Publication Data
US 2018/0039361 A1    Feb. 8, 2018

(30) Foreign Application Priority Data

Aug. 5, 2016 (KR) .................. 10-2016-0100006

(51) Int. Cl.
| | |
|---|---|
| G06F 3/041 | (2006.01) |
| G02B 5/30 | (2006.01) |
| G02F 1/1333 | (2006.01) |
| G02F 1/1343 | (2006.01) |
| G06F 3/044 | (2006.01) |
| G02F 1/1335 | (2006.01) |

(52) U.S. Cl.
CPC ......... *G06F 3/0412* (2013.01); *G02B 5/3025* (2013.01); *G02F 1/1343* (2013.01); *G02F 1/13338* (2013.01); *G02F 1/133528* (2013.01); *G06F 3/044* (2013.01); *G06F 2203/04102* (2013.01); *G06F 2203/04107* (2013.01); *G06F 2203/04111* (2013.01)

(58) Field of Classification Search
CPC combination set(s) only.
See application file for complete search history.

(56) References Cited

FOREIGN PATENT DOCUMENTS

| KR | 10-2011-0021532 A | 3/2011 |
|---|---|---|
| KR | 10-2013-0111598 A | 10/2013 |
| KR | 10-1444132 B1 | 11/2014 |

OTHER PUBLICATIONS

JP 2003227927 Taguchi, Keiichi Aug. 15, 2003.*
Office action dated Dec. 20, 2017 from Korean Patent Office in a counterpart Korean Patent Application No. 10-2016-0100006.
Notice of Allowance dated Apr. 30, 2018 from Korean Patent Office in a counterpart Korean Patent Application No. 10-2016-0100006 (Translation is submitted herewith.).

* cited by examiner

*Primary Examiner* — Van N Chow
(74) *Attorney, Agent, or Firm* — The PL Law Group, PLLC

(57) ABSTRACT

A touch sensor laminate includes a polarizing plate having a predetermined stretching direction, and a sensing pattern layer formed on at least one surface of the polarizing plate. The sensing pattern layer includes a first pattern formed along a first direction, a second pattern formed along a second direction, and a bridge electrode electrically connecting isolated unit patterns included in the second pattern. The first pattern includes a plurality of unit patterns, and a connection portion connecting neighboring unit patterns of the plurality of unit patterns, the connection portion having a width smaller than a maximum width of the unit pattern of the first pattern. An angle between the stretching direction of the polarizing plate and a length direction of the connection portion is 60° or less.

12 Claims, 2 Drawing Sheets

TOUCH SENSOR LAMINATE, TOUCH SCREEN PANEL AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2016-0100006 filed on Aug. 5, 2016 in the Korean Intellectual Property Office (KIPO), the entire disclosure of which is incorporated by reference herein.

BACKGROUND

1. Field

The present invention relates to a touch sensor laminate, a touch screen panel and an image display device including the same.

2. Description of the Related Art

A touch screen panel is an input device configured to transfer a user's instruction by selecting an object demonstrated on a display plane of, e.g., an image display device using a human hand or an additional input tool.

For example, the touch screen panel may be disposed at a front face of the image display device, and may convert a touched area being in contact with the human hand or the input tool into an electrical signal. An instruction selected at the touched area may be received as an input signal.

An individual input device such as a keyboard or a mouse which may be connected to the image display device may be replaced with the above-mentioned touch screen panel, and thus the touch screen panel has been widely used in various devices.

The touch screen panel may be categorized into, e.g., a resistive type, a light-sensitive type and a capacitive type according to an operational mechanism thereof. In the capacitive type touch screen panel, a conductive sensing pattern may detect a change of capacitance formed together with other sensing patterns or a ground electrode when being touched by the human hand or the input tool so that the touched area may be converted into the electrical signal.

The touch screen panel is commonly attached to an outer face of a flat panel display device such as a liquid crystal display device, an organic electro-luminescence light emitting device, etc., to be integrated as a product. Thus, a high transparency and a thin thickness of the touch screen panel may be preferably required.

Recently, a flexible flat panel display device has been developed, and a flexible property may be also required in the touch screen panel attached to the flexible flat panel display device.

However, an ITO pattern commonly used as a sensing pattern of the touch screen panel may have poor flexibility, and may be easily fractured or destroyed when contraction, expansion or bending force is applied thereto. Accordingly, a desired flexible property may not be achieved.

SUMMARY

According to an aspect of the present invention, there is provided a touch sensor laminate in which a sensing pattern layer may be prevented from being damaged by a contraction or an expansion due to a time-dependent change or a warpage of a polarizing plate.

According to an aspect of the present invention, there is provided a touch screen panel including the touch sensor laminate.

According to an aspect of the present invention, there is provided an image display device including the touch screen panel.

The above aspects of the present inventive concepts will be achieved by the following characteristics:

(1) A touch sensor laminate, including: a polarizing plate having a predetermined stretching direction; and a sensing pattern layer formed on at least one surface of the polarizing plate, the sensing pattern layer including: a first pattern formed along a first direction that is parallel to the one surface of the polarizing plate; a second pattern formed along a second direction that is parallel to the one surface of the polarizing plate, the first and second directions crossing each other; and a bridge electrode electrically connecting isolated unit patterns included in the second pattern, wherein the first pattern includes a plurality of unit patterns, and a connection portion connecting neighboring unit patterns of the plurality of unit patterns, the connection portion having a width smaller than a maximum width of the unit pattern of the first pattern, wherein an angle between the stretching direction of the polarizing plate and a length direction of the connection portion is 60° or less.

(2) The touch sensor laminate according to the above (1), wherein the stretching direction of the polarizing plate is horizontal with respect to the length direction of the connection portion.

(3) The touch sensor laminate according to the above (1), wherein an angle between the stretching direction of the polarizing plate and a length direction of the bridge electrode is in a range from about 30° to about 90°.

(4) The touch sensor laminate according to the above (1), wherein the stretching direction of the polarizing plate is perpendicular with respect to a length direction of the bridge electrode.

(5) The touch sensor laminate according to the above (1), wherein the stretching direction of the polarizing plate is horizontal with respect to the length direction of the connection portion, and perpendicular with respect to a length direction of the bridge electrode.

(6) The touch sensor laminate according to the above (1), wherein at least one bending portion is formed in the touch sensor laminate.

(7) The touch sensor laminate according to the above (6), wherein the length direction of the connection portion is perpendicular with respect to a bending direction of the bending portion.

(8) The touch sensor laminate according to the above (6), wherein a length direction of the bridge electrode is horizontal with respect to a bending direction of the bending portion.

(9) The touch sensor laminate according to the above (1), wherein the polarizing plate includes a polarizer and a protective film formed at least one surface of the polarizer.

(10) The touch sensor laminate according to the above (1), further including an organic layer between the polarizing plate and the sensing pattern layer.

(11) A touch screen panel including the touch sensor laminate according to any one of the above (1) to (10).

(12) An image display device including the touch screen panel according to the above (11).

In a touch sensor laminate according to example embodiments, a sensing pattern layer may be protected from being damaged by a contraction or an expansion due to a time-dependent change or a warpage of a polarizing plate.

In some embodiments, a bridge electrode of the touch sensor may be formed along a direction substantially the same as a bending direction so that electrode damages and cracks at a bending region may be suppressed.

According to example embodiments, a touch screen panel including the touch sensor laminate may be provided.

According to example embodiments, an image display device including the touch screen panel may be provided.

DETAILED DESCRIPTION

Figure 1:
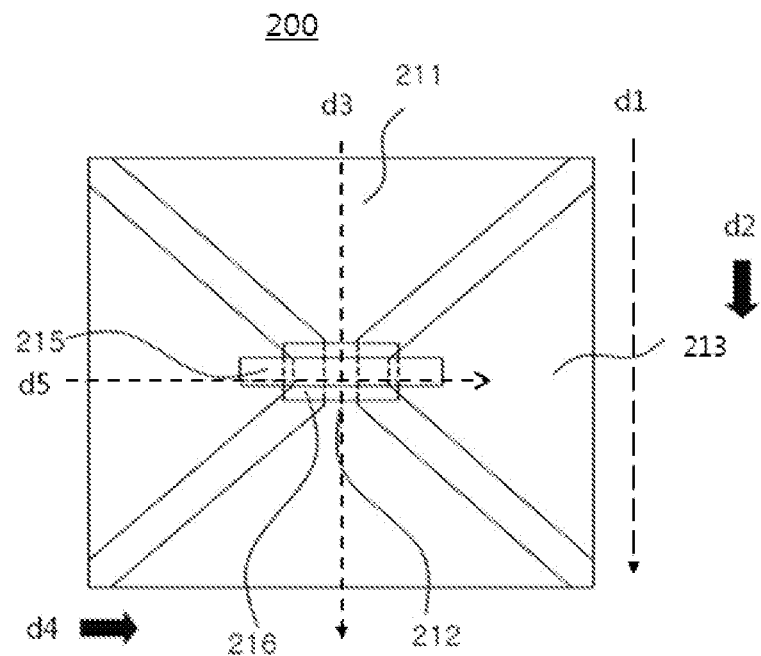
FIG. 1 is a schematic top plan view illustrating a touch sensor laminate in accordance with example embodiments.

Example embodiments of the present invention provide a touch sensor laminate including a polarizing plate and a sensing pattern layer formed on at least one surface of the polarizing plate. The sensing pattern layer includes a first pattern formed along a first direction, a second pattern formed along a second direction, and a bridge electrode electrically connecting isolated unit patterns included in the second pattern. The first pattern includes a plurality of unit patterns, and a connection portion connecting neighboring unit patterns of the plurality of unit patterns. An angle between the stretching direction of the polarizing plate and a length direction of the connection portion is 60° or less. Thus, the sensing pattern layer may be protected from being damaged by a contraction or an expansion due to a time-dependent change or a warpage of the polarizing plate.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms used herein "perpendicular" (or "vertical"), and "horizontal" mean substantially "perpendicular" and "horizontal," and thus include mathematically strict "perpendicular" and "horizontal," and also include ranges generally regarded as perpendicular and horizontal. For example, the "perpendicular" may be in a range of 90±10°, and the "horizontal" may be in a range of 0±10°.

<Touch Sensor Laminate>

A touch sensor laminate may include a polarizing plate 100 having a predetermined stretching direction (denoted as "d1"), and a sensing pattern layer 200. The sensing pattern layer 200 may include a sensing pattern 210 that may include a first pattern 211 formed along a first direction (denoted as "d2"), and a second pattern 213 formed along a second direction (denoted as "d4").

Polarizing Plate 100

The polarizing plate 100 may have the predetermined stretching direction (d1), and may include a polarizer.

Polarizer

The polarizer may include an optical film capable of converting an incident natural light into a single polarized state (e.g., a linearly polarized stated), and may include a polyvinylalcohol-based resin film in which a dichroic dye may be adsorbed and oriented.

The polyvinylalcohol-based resin for the polarizer may be prepared by a saponification of a polyvinyl acetate-based resin.

The polyvinyl acetate-based resin may include polyvinyl acetate as a homopolymer of vinyl acetate, a copolymer of vinyl acetate and a monomer copolymerizable therewith. The monomer copolymerizable with vinyl acetate may include, for example, unsaturated carboxylic acid monomers, unsaturated sulfonic acid monomers, olefin monomers, vinyl ether monomers, ammonium group-containing acrylamide monomers, etc. A saponification degree of the polyvinylalcohol-based resin may range from 85 to 100 mol %, preferably 98 mol % or more. A polymerization degree of the polyvinylalcohol-based resin may range from 1,000 to 10,000, preferably 1,500 to 5,000.

The polarizer may be formed by stretching the polyvinylalcohol-based film, adsorbing the stretched polyvinylalcohol-based film with the dichroic dye, treating the dichroic dye-adsorbed polyvinylalcohol-based film with a boric acid solution, and then washing the polyvinylalcohol-based film. The dichroic acid may include iodine or a dichroic organic dye. A thickness of the achieved polarizer may range from about 5 μm to about 40 μm.

For example, a process of uniaxially stretching the polyvinylalcohol-based film may be performed before a dyeing process, simultaneously with the dyeing process or after the dyeing process. When being performed after the dyeing process, the uniaxially stretching process may be performed before the boric acid treatment or during the boric acid treatment. The uniaxially stretching process may be also performed in a plurality of stages. The uniaxially stretching process may be performed using a roll with different casting speed or a thermal roll. The uniaxially stretching process may include a dry stretching in an atmosphere, or a wet stretching in a solvent-swelling state. A stretching ratio may be normally 4 to 8. The stretching of the polarizer may be performed in various directions. In the present inventive concepts, the term "stretching direction" refers to a direction in which the polarizer is stretched most.

The polarizing plate 100 may include the polarizer having the stretching direction (d1). According to example embodiments, the stretching direction (d1) may be determined in consideration of the first direction (d2), the second direction (d4), a length direction of a connection portion (d3), a length direction of a bridge electrode (d5) or a bending direction as described below.

In an embodiment, a polarizer protective film may be disposed on at least one surface of the polarizer. The polarizer protective film may include a material commonly known in the related art. For example, a polyester-based resin such as polyethylene terephthalate, polyethylene isophthalate, polyethylene naphthalate and polybutylene terephthalate, a cellulose-based resin such as diacetyl cellulose, triacetyl cellulose and cellulose acetate propionate, a polycarbonate-based resin, a polyacryl-based resin such as polymethyl(meta)acrylate and polyethyl(meta)acrylate, a styrene-based resin such as polystyrene and acrylonitrile-styrene copolymer, a polyolefin-based resin such as polyethylene, polypropylene, cyclo-based or norbornene-structured polyolefin and ethylene-propylene copolymer, a polyamide-based resin such as nylon and aromatic polyamide, an imide-based resin, a polyether-sulfone-based resin, a sulfone-based resin, a polyether-ether-ketone-based resin, a polyphenylene-sulfide-based resin, a vinyl alcohol-based resins, a vinylidene chloride-based resin, a vinyl butyral-based resins, an allylate-based resin, a polyoxymethylene-based resin, and an epoxy-based resin, may be used, and a film composed of a blend of the thermoplastic resins may be used. A film formed of (meta) acryl-based, urethane-based, acryl-urethane-based, epoxy-based and silicon-based thermoplastic resins, or a UV-cured resin may be also used.

In an embodiment, a cycloolefin-based resin well-known in the related art may be used for the protective film. For example, the cycloolefin-based resin may be a thermoplastic resin having cycloolefin monomer units such as norbornene or multi-cyclic norbornene monomers, a ring-opening polymer from cycloolefin compounds, a hydrogen adduct of a ring-opening polymer from at least two cycloolefin compounds, an adduct copolymer of the cycloolefin compound, and a linear olefin or an aromatic compound having a vinyl group. Additionally, a polar group may be introduced into the cycloolefin-based resin.

For example, a cellulose-based film, a polyolefin-based film, a polyacryl-based film may be used as the polarizer protective film in consideration of polarizing property and mechanical strength.

In an embodiment, a functional surface treatment layer such as a hard coating layer, an anti-reflection layer, an anti-glare layer, an anti-static layer, etc., may be formed instead of the polarizing protective film on the at least one surface of the polarizer.

Sensing Pattern Layer 200

A sensing pattern 210 included in the sensing pattern layer 200 may be configured to provide information with regard to coordinates of the first direction (d2) and the second direction (d4) at a touched area. Specifically, when a human hand or an individual tool touches a cover window substrate, a change of capacitance according to the touched area may be transferred to a driving circuit via the sensing pattern 210 and a position detecting line. The change of capacitance may be converted into an electrical signal to detect the touched area.

In example embodiments, the first direction (d2) and the second direction (d4) may refer to two directions being parallel to one surface (e.g., a top surface) of the polarizing plate or a substrate, and crossing each other. For example, the first direction (d2) and the second direction (d4) may be substantially perpendicular to each other.

Figure 2:
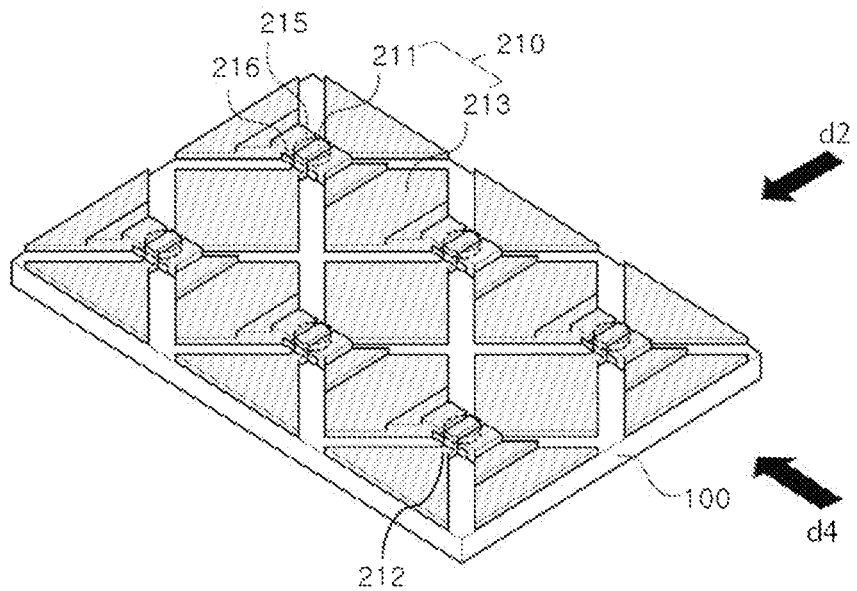
FIG. 2 is a schematic perspective view illustrating a touch sensor laminate in accordance with example embodiments.

FIG. 1 is a schematic top plan view illustrating the touch sensor laminate in accordance with example embodiments. For example, FIG. 1 is a top plan view partially enlarging a specific region of the touch sensor laminate. FIG. 2 is a schematic perspective view illustrating the touch sensor laminate in accordance with example embodiments.

Referring to FIGS. 1 and 2, the sensing pattern 210 may include the first pattern 211 formed along the first direction (d2) and the second pattern 213 formed along the second direction (d4).

The first pattern 211 and the second pattern 213 may be formed at the same level or at the same layer. In example embodiments, the first pattern 211 may include unit patterns connected to each other along the first direction (d2) via a connection portion 212. As illustrated in FIG. 2, a width (e.g., a maximum width) of the connection portion 212 may be smaller than a maximum width of the unit pattern included in the first pattern 211.

A thickness of the sensing pattern 210 may not be specifically limited. For example, the thickness of the sensing pattern 210 may be in a range from about 10 nm to about 200 nm. If the thickness of the sensing pattern is less than about 10 nm, electrical resistance of the sensing pattern 210 may become excessively greater to deteriorate touch sensitivity. If the thickness of the sensing pattern exceeds about 200 nm, the sensing pattern may become visible.

The sensing pattern 210 may include a transparent electrode material widely known in the related art. For example, the sensing pattern 210 may include indium tin oxide (ITO), indium zinc oxide (IZO), zinc oxide (ZnO), indium zinc tin oxide (IZTO), cadmium tin oxide (CTO), a metal wire, etc. These may be used alone or in a combination thereof. Preferably, the sensing pattern 210 may include ITO.

In example embodiments, an angle (i.e., an angle difference) between the stretching direction (d1) of the polarizing plate 100 and the length direction (d1) of the connection portion 212 may be less than 60° or less, preferably 45° or less.

As illustrated in FIG. 1, the connection portion 212 may be a portion connecting the neighboring unit patterns of the first pattern 211. The length direction (d3) of the connection portion 212 may refer to a direction along which the unit patterns are connected. In an embodiment, the length direction (d3) of the connection portion 212 may be substantially the same as the first direction d2.

In example embodiments, the angle between the stretching direction (d1) and the length direction (d3) of the connection portion 212 may be 60° or less, so that the sensing pattern layer 200 may be protected from being damaged by a contraction or an expansion due to a time-dependent change or a warpage of the polarizing plate 100, and thus the touch sensor of high reliability may be fabricated.

From the aspects described above, the stretching direction (d1) of the polarizing plate 100 and the length direction (d3) of the connection portion 212 may be substantially horizontal or parallel.

The second pattern 213 may include isolated unit patterns (e.g., island patterns) along the second direction (d4). The sensing pattern layer 200 may additionally include a bridge electrode 215 to electrically connect the neighboring isolated unit patterns of the second pattern 213.

As illustrated in FIG. 2, the bridge electrode 215 and the connection portion 212 may substantially cross each other. In an embodiment, an insulation layer 216 may be interposed between the bridge electrode 215 and the connection portion 212 so that the first and second patterns 211 and 213 may be insulated from each other.

The bridge electrode 215 may be configured to electrically connect the isolated unit patterns of the second pattern 213. The insulation layer 216 may be formed so that the bridge electrode 215 may be electrically blocked from the first pattern 211 of the sensing pattern 210 as described below.

The bridge electrode 215 may be formed on or under the second pattern 213, and a stacking order or sequence of the sensing pattern 210 and the insulation layer 216 may be properly adjusted according to a widely known method.

The bridge electrode 215 may be formed of a metal or a metal oxide, and may be preferably formed of the same material as that of a metal wiring and the position detecting line disposed at a non-display region. In this case, the bridge electrode 215 may be formed during while forming the metal wiring and the position detecting line so that an entire fabrication process may be simplified.

The term "non-display region" may refer to a peripheral region (e.g., a bezel) of a touch screen panel including a touch sensor, at which an image may not be displayed. A display region may refer to a region at which the image may be displayed. The sensing pattern 210 and the bridge electrode 215 formed at the display region may detect a touch signal of the user, and the touch signal may be transferred to the driving circuit via the position detecting line at the non-display region.

The metal having improved electrical conductivity and reduced resistance may be used. For example, the bridge electrode 215 may be formed of molybdenum, silver, aluminum, copper, palladium, gold, platinum, zinc, tin, titanium, etc., or an alloy thereof. The metal oxide may include a conductive metal oxide such as indium tin oxide (ITO), indium zinc oxide (IZO), indium zinc tin oxide (IZTO), aluminum zinc oxide (AZO), gallium zinc oxide (GZO), fluorine tin oxide (FTO), ITO-Ag-ITO, IZO-Ag-IZO, IZTO-Ag-IZTO, AZO-Ag-AZO, etc. These may be used alone or in a combination thereof. Preferably, a metal having enhanced malleability and ductility may be used for effectively preventing cracks.

The insulation layer 216 may be interposed between the first pattern 211 and the bridge electrode 215 to prevent a short-circuit between the first pattern 211 and the bridge electrode 215.

In an embodiment, the insulation layer 216 may be formed at a specific area between the first pattern 211 and the bridge electrode 215. For example, the insulation layer 216 may be formed as a pattern selectively on the connection portion 212 of the first pattern 211.

In an embodiment, the insulation layer 216 may be formed on an entire top surface of the first pattern 211 including the connection portion 212. In this case, the bridge electrode 215 may be electrically connected to the second pattern 213 via a contact hole formed in the insulation layer 216.

The insulation layer 216 may be formed of a transparent insulation material well known in the related art. For example, silicon oxide, a metal oxide, a transparent photosensitive resin composition including an acryl-based resin or a thermosetting resin composition may be used for forming the insulation layer 216.

In an embodiment, an angle between the stretching direction (d1) of the polarizing plate 100 and the length direction (d5) of the bridge electrode 215 may be in a range from about 30° to about 90°. The advantageous effects according to the present inventive concepts may be obtained within this range. From this aspect, the stretching direction (d1) of the polarizing plate 100 and the length direction (d5) of the bridge electrode 215 may be substantially perpendicular. In an embodiment, the length direction (d5) of the bridge electrode 215 may be substantially the same as the second direction (d4).

More preferably, the stretching direction (d1) of the polarizing plate 100 may be parallel or horizontal with respect to the length direction (d3) of the connection portion 212, and may be perpendicular to the length direction (d5) of the bridge electrode 215.

Figure 3:
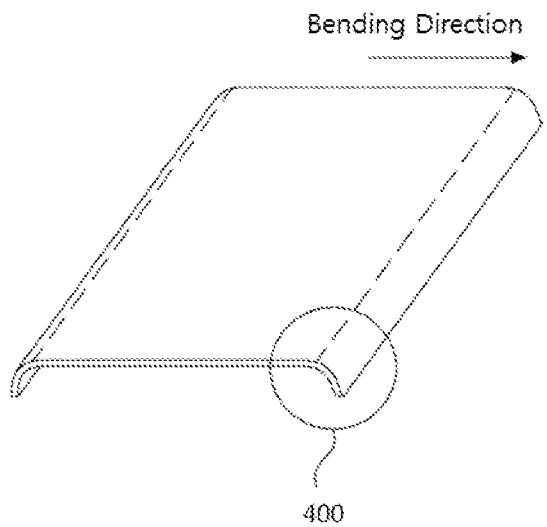
FIGS. 3 and 4 are a schematic perspective view and a top plan view, respectively, illustrating a touch sensor laminate in accordance with some example embodiments.
Figure 4:
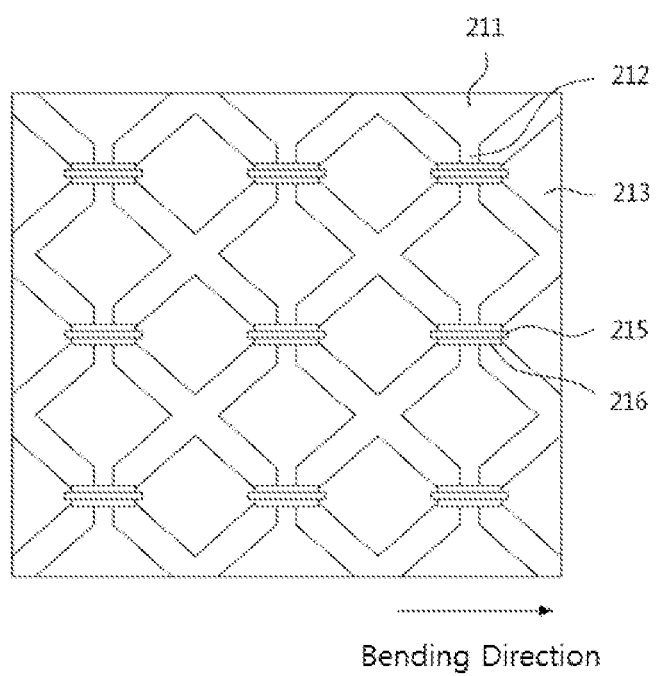

FIGS. 3 and 4 are a schematic perspective view and a top plan view, respectively, illustrating a touch sensor laminate in accordance with some example embodiments.

Referring to FIGS. 3 and 4, the touch sensor laminate may include at least one bending portion 400.

A method of forming the bending portion 400 may not be specifically limited. For example, the touch sensor laminate may be disposed on a flat substrate, and then a predetermined region may be bent to form the bending portion 400.

After the bending process, a stress may be concentrated at the bending portion 400 of the touch sensor laminate to cause cracks of the sensing pattern 210. Thus, the bending portion 400 may preferably have a resistance to the stress so that the cracks may be avoided or reduced. Further, if a contraction/expansion stress from the polarizer is added to the bending portion 400, the cracks of the sensing pattern 210 (e.g., the connection portion 212) may be exacerbated.

From the above-mentioned aspects, the length direction (d3) of the connection portion 212 or the first direction (d2) may be perpendicular to a bending direction of the bending portion 400, so that the cracks of the sensing pattern may be effectively prevented.

As illustrated in FIG. 1, the length direction (d5) of the bridge electrode 215 may be parallel or horizontal to the bending direction of the bending portion 400. Accordingly, damages and cracks of electrodes may be prevented during the bending process and after forming the bending portion 400.

From this aspect, a line width of the bridge electrode 215 may be from about 1.5% to about 200% of a line width of the connection portion 212 included in the first pattern 211. The above-mentioned effects may be well achieved in this range.

A thickness of the bridge electrode 215 is not specifically limited. For example, the thickness of the bridge electrode 215 may be from about 20% to about 1,300% relative to the unit pattern of the second pattern 213, preferably from about 30% to about 900%. If the thickness of the bridge electrode 215 is less than about 20% of the unit pattern of the second pattern 213, resistance may become greater to degrade touch sensitivity. If the thickness of the bridge electrode 215 exceeds about 1,300%, cracks may be caused in the bridge electrode 215.

An angle between the bridge electrode 215 and the first direction (d2) may be substantially the same as an angle between the bending direction and the first direction (d2), and may be greater than 0° and less than 90°, preferably in a range from about 30° to about 90°, more preferably in a range from about 45° to about 90°. The cracks may be reduced in the bridge electrode 215 within this range.

In an embodiment, the angle between the bridge electrode 215 and the first direction (d2) may be less than 90° in consideration of relieving a bending stress. For example, the angle may be in a range from about 30° to about 90°, preferably in a range from about 45° to about 90° so that the bending stress may be effectively relieved.

Organic/Inorganic Layer (Passivation Layer)

In an embodiment, the touch sensor laminate may further include an organic layer or an inorganic layer between the polarizing plate 100 and the sensing pattern layer 200 to provide a protection and an adhesion of the polarizing plate 100 and the sensing pattern layer 200.

The organic or inorganic layer may include any protective and insulation layer well known in the related art. For example, the organic layer may include acryl-based, epoxy-based, siloxane-based, urethane-based, polyimide-based resins, etc., and the inorganic layer may include $SiO_2$, $SiN_x$, etc.

A thickness of the organic layer may be determined in consideration of electrode protection and insulation, for example, may be in a range from about 0.1 μm to about 5 μm, preferably in a range from about 0.3 μm to about 2.5 μm.

A thickness of the inorganic layer may be determined in consideration of electrode protection and insulation, for example, may be in a range from about 0.05 μm to about 1 μm, preferably in a range from about 0.1 μm to about 0.5 μm.

The sensing pattern layer 200 may be disposed on a substrate.

The substrate may be provided to support electrodes. In example embodiments, the first pattern 211 formed along the first direction (d2) and the second pattern 213 formed along the second direction (d4) may be disposed on the substrate. The substrate may have a flexible property.

The substrate may include a material widely known in the related art. For example, the substrate may include glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), cyclo olefin polymer, etc.

A thickness of the substrate according to example embodiments may not be specifically limited, and may be adjusted so that the substrate may be bent or folded. In this aspect, the thickness of the substrate may be in a range from about 3 μm to about 100 μm, preferably from about 5 μm to about 80 μm.

The substrate may also include the bending portion 400. The bending portion 400 may be included in consideration of functional or designing aspects of a touch screen panel. For example, an individual image may be displayed at the bending portion 400.

The bending portion 400 may be formed in at least one portion of the substrate. For example, the bending portion 400 may be formed along at least one lateral periphery of the substrate as illustrated in FIG. 3. Alternatively, the bending portion 400 may be formed at a central region in a foldable touch panel. When the substrate includes the bending portion 400, the bridge electrode 215 may be disposed at the bending portion 400.

The bending direction 400 of the bending portion 400 is not specifically limited. Preferably, the bending direction may be substantially the same as a direction of one side of the substrate. For example, the bending direction of the bending portion 400 may be a horizontal direction from a top plan view of the substrate.

A width of the bending portion 400 is not specifically limited. For example, the width of the bending portion 400 may be in a range from about 0.1 mm to about 20 mm.

A bending angle of the bending portion 400 may be controlled so that damages and cracks may be prevented in the bridge electrode 215 facing the bending portion 400. For example, the bending angle may be greater than 0° and less than 180°, preferably in a range from about 2° to about 168°, more preferably in a range from about 4° to about 166°. In the above range, cracks may be effectively prevented in a touch electrode.

<Touch Screen Panel and Image Display Device>

Further, the present invention provides a touch screen panel including the above-described touch sensor laminate.

The touch screen panel according to example embodiments may include elements and/or structures well known to ordinarily skilled in the art in addition to the touch sensor laminate.

The touch screen panel may be combined to an image display device well known in the related art. Non-limiting examples of the image display device include, e.g., a liquid crystal display (LCD), a field emission display (FED), a plasma display panel (PDP), an organic light emitting diode (OLED), etc.

Hereinafter, exemplary embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXAMPLES AND COMPARATIVE EXAMPLES

Example 1

A sensing pattern was formed to have a thickness of 45 nm on a COP substrate having a thickness of 40 μm. In the sensing pattern, the first pattern was formed along a first direction to include unit patterns connected by a connection portion, and the second pattern was formed along a second direction (perpendicular to the first direction) to include unit patterns isolated with respect to the connection portion.

An insulation layer was formed on the connection portion (line width: 130 μm) of the first pattern, and an ITO bridge electrode (line width: 30 μm, thickness: 135 nm) was formed on the insulation layer along the second direction such that the isolated unit patterns of the second pattern were electrically connected to obtain a touch sensor laminate.

An angle between a stretching direction of a polarizing plate and a length direction of the connection portion was 0°. An angle between the stretching direction of the polarizing plate and a length direction of the bridge electrode was 90°.

Example 2

The process the same as that described in Example 1 was performed except that the angle between the stretching direction and the length direction of the connection portion was 15°, and the angle between the stretching direction and the length direction of the bridge electrode was 75° to obtain a touch sensor laminate.

Example 3

The process the same as that described in Example 1 was performed except that the angle between the stretching direction and the length direction of the connection portion was 30°, and the angle between the stretching direction and the length direction of the bridge electrode was 60° to obtain a touch sensor laminate.

Example 4

The process the same as that described in Example 1 was performed except that the angle between the stretching direction and the length direction of the connection portion was 45°, and the angle between the stretching direction and the length direction of the bridge electrode was 45° to obtain a touch sensor laminate.

Example 5

The process the same as that described in Example 1 was performed except that the angle between the stretching direction and the length direction of the connection portion was 60°, and the angle between the stretching direction and the length direction of the bridge electrode was 30° to obtain a touch sensor laminate.

Comparative Example 1

The process the same as that described in Example 1 was performed except that the angle between the stretching direction and the length direction of the connection portion was 70°, and the angle between the stretching direction and the length direction of the bridge electrode was 20° to obtain a touch sensor laminate.

Comparative Example 2

The process the same as that described in Example 1 was performed except that the angle between the stretching direction and the length direction of the connection portion was 80°, and the angle between the stretching direction and the length direction of the bridge electrode was 10° to obtain a touch sensor laminate.

Comparative Example 3

The process the same as that described in Example 1 was performed except that the angle between the stretching direction and the length direction of the connection portion was 90°, and the angle between the stretching direction and the length direction of the bridge electrode was 0° to obtain a touch sensor laminate.

Experimental Example: Evaluation of Crack Generation

The touch sensor laminate of Examples and Comparative Examples were maintained for 24 hours in a condition including a radius of 2.5 mm and a bending angle of 45°, and then the number of channels including cracks among entire 27 channels was measured. The results are shown in Table below.

TABLE 1

| | Angle between the stretching direction and the length direction of the connection portion | Evaluation of Cracks the number of channels (including cracks) |
|---|---|---|
| Example 1 | 0° | 0 |
| Example 2 | 15° | 0 |
| Example 3 | 30° | 0 |
| Example 4 | 45° | 1 |
| Example 5 | 60° | 3 |
| Comparative Example 1 | 70° | 9 |
| Comparative Example 2 | 80° | 15 |
| Comparative Example 3 | 90° | 18 |

Referring to Table 1, electrode damages and cracks in the sensing pattern were significantly reduced in the touch sensor laminates of Examples.

It will be obvious to those skilled in the related art that the preferred embodiments described above are only examples of the present inventive concepts and therefore do not limit the accompanying claims, and various modifications and alterations can be made without departing from the scope and spirit of the present invention. In addition, these modifications and alterations will fall within the following claims.

What is claimed is:

1. A touch sensor laminate, comprising:
a polarizing plate having a predetermined stretching direction; and
a sensing pattern layer formed on at least one surface of the polarizing plate, the sensing pattern layer including:
a first pattern formed along a first direction that is parallel to the one surface of the polarizing plate;
a second pattern formed along a second direction that is parallel to the one surface of the polarizing plate, the first and second directions crossing each other; and
a bridge electrode electrically connecting isolated unit patterns included in the second pattern,
wherein the first pattern includes a plurality of unit patterns, and a connection portion connecting neighboring unit patterns of the plurality of unit patterns, the connection portion having a width smaller than a maximum width of the unit pattern of the first pattern; and
an angle between the stretching direction of the polarizing plate and a length direction of the connection portion is 60° or less.

2. The touch sensor laminate of claim 1, wherein the stretching direction of the polarizing plate is horizontal with respect to the length direction of the connection portion.

3. The touch sensor laminate of claim 1, wherein an angle between the stretching direction of the polarizing plate and a length direction of the bridge electrode is in a range from about 30° to about 90°.

4. The touch sensor laminate of claim 1, wherein the stretching direction of the polarizing plate is perpendicular with respect to a length direction of the bridge electrode.

5. The touch sensor laminate of claim 1, wherein the stretching direction of the polarizing plate is horizontal with respect to the length direction of the connection portion, and perpendicular with respect to a length direction of the bridge electrode.

6. The touch sensor laminate of claim 1, wherein at least one bending portion is formed in the touch sensor laminate.

7. The touch sensor laminate of claim 6, wherein the length direction of the connection portion is perpendicular with respect to a bending direction of the bending portion.

8. The touch sensor laminate of claim 6, wherein a length direction of the bridge electrode is horizontal with respect to a bending direction of the bending portion.

9. The touch sensor laminate of claim 1, wherein the polarizing plate includes a polarizer and a protective film formed at least one surface of the polarizer.

10. The touch sensor laminate of claim 1, further comprising an organic layer between the polarizing plate and the sensing pattern layer.

11. A touch screen panel comprising the touch sensor laminate of claim 1.

12. An image display device comprising the touch screen panel of claim 11.

* * * * *